United States Patent [19]

Faust et al.

[11] 4,316,805
[45] Feb. 23, 1982

[54] OIL SEPARATION AND RECOVERY PROCESS AND APPARATUS

[75] Inventors: Elbert R. Faust, Litchfield, Conn.; Stuart F. Faunce, Fanwood, N.J.

[73] Assignee: Faunce and Associates, Inc., Fanwood, N.J.

[21] Appl. No.: 95,430

[22] Filed: Nov. 19, 1979

[51] Int. Cl.³ ............................................. B01D 57/00
[52] U.S. Cl. .................................. 210/693; 210/708; 210/748; 210/804; 210/187; 210/243
[58] Field of Search .......... 210/71, 730 W, 83, 242 R, 210/242 AS, DIG. 26, 195.1, 196, 197, 305, 320, 256, 259, 774, 776, 708, 149, 693, 748, 804, 187, 243

[56] References Cited

U.S. PATENT DOCUMENTS

| | | | |
|---|---|---|---|
| 2,434,679 | 1/1948 | Wagner et al. | 210/167 |
| 2,595,559 | 5/1952 | Alvord | 210/167 |
| 2,675,126 | 4/1954 | Williams | 210/187 |
| 3,794,583 | 2/1974 | Rhodes | 210/500 |
| 3,810,832 | 5/1974 | Rhodes | 210/170 |
| 4,081,338 | 3/1978 | Golovoy | 210/708 |
| 4,105,553 | 8/1978 | Oldham | 210/83 |
| 4,126,551 | 11/1978 | Cognevich | 210/83 |
| 4,126,556 | 11/1978 | Swanson et al. | 210/242 AS |
| 4,132,645 | 1/1979 | Bottomley | 210/104 |
| 4,194,972 | 3/1980 | Weintraub et al. | 210/708 |

OTHER PUBLICATIONS

"Advanced Oil/Water Separation Dual Mode Gravity & Coalescing Separator", Proc. and Pollu. Controls Division, 1977.

Primary Examiner—Ivars C. Cintins
Attorney, Agent, or Firm—Kenneth P. Glynn

[57] ABSTRACT

The present invention is directed to a process for separating oil from water in a mixture containing oil and water, as well as to means for performing the separation process. Specifically, the process involves:

(a) feeding said mixture to a heated hold-up tank via an inlet located at a lower level of said tank, said tank having a residence time sufficient to permit separation of oil and water and formation of a water-in-oil emulsion which rises to float atop of said water, said tank being heated to a temperature within the range of about 160° F. to about 180° F.;

(b) removing water from the bottom of said heated hold-up tank;

(c) removing said emulsion from the top of said heated hold-up tank via an outlet located above the top of said water in said heated hold-up tank;

(d) feeding said removed emulsion to a hold-up tank having a first compartment and a second compartment, said feeding being to said first compartment;

(e) permitting water contained in said fed emulsion to settle to the bottom of said first compartment;

(f) withdrawing water from the bottom of said first compartment as necessary;

(g) removing oil from the top of said first compartment to said second compartment via a hydrophobic wick; and (h) removing said oil from said second compartment as desired.

8 Claims, 2 Drawing Figures

OIL SEPARATION AND RECOVERY PROCESS AND APPARATUS

BACKGROUND OF THE INVENTION

The present invention relates to a process for separating oil from water in a mixture containing oil and water and to an apparatus for performing the process. More particularly, the present invention involves such a process and apparatus wherein multistage separation is employed in a unique manner in combination with the use of a hydrophobic wick.

PRIOR ART STATEMENT

Many existing oil-water separators utilize a one-stage design in which oil is skimmed off the top of the oil-water mixture. The skimming is sometimes accomplished with a pump and a doughnut floater or a floater having a variable baffle design. While these systems have been designed to separate the oil in a one-stage operation, they unfortunately produce oil output which contains substantial and sometimes problematic amounts of water. Thus, many oil-water separators have been developed over the years in attempting to alleviate the mentioned problems.

For example, U.S. Pat. No. 2,675,126 is directed to an improved apparatus for separating oil from water. The apparatus comprises a settling tank, an oil receiving tank above the settling tank for the oil and water to be treated, an oil supply pipe connected to said oil receiving tank, a pipe connection between the oil receiving and the settling tank, through which settling tank free water in the oil will flow to the settling tank, a heating element in the oil receiving tank for separating the oil from the water so the oil will flow upwardly, a second oil receiving tank above the first mentioned oil receiving tank, and into which second oil receiving tank the oil from the water and oil in the first oil receiving tank is discharged, a discharge pipe carried by the second oil receiving tank for discharging separated oil from the oil in the second oil receiving tank, overflow means in the second oil receiving tank for maintaining a constant oil level therein and a gas and vapor space above the oil level therein, float control means for admitting gas under pressure in the gas and vapor space above the oil in the second oil receiving tank, an exchanger cooler above the second oil receiving tank, the upper end of said exchanger cooler having an exchanger chamber, a passage of communication between the exchanger chamber and the gas and vapor space in the second oil receiving tank, said exchanger forming means for separating additional water and oil from the gas and vapor and discharging the gas from the exchanger, a pipe connecting the exchanger and the discharge pipe from the second oil receiving tank and through which oil from the exchanger passes to the last named discharge pipe, means for discharging the water from the exchanger and means for maintaining a constant water level in the first mentioned oil receiving tank.

U.S. Pat. Nos. 4,132,645; 2,595,559 and 2,434,679 are exemplary of prior art which describes oil-water mixture separation using multiple stages. U.S. Pat. No. 4,132,645 describes a two-stage oil skimmer separator, the first stage of which includes a gravity separation tank wherein the oil is skimmed off the top and directed to the second stage. This second stage involves a heated separator from which more water is separated out of the oil from the bottom of the second separator and is returned to the first stage for further separation. U.S. Pat. No. 2,595,559 describes a plural liquid unit for grinding machines which involves separation of oil from water using a long path tank with a plurality of transverse positions. U.S. Pat. No. 2,434,679 describes a grinding system which includes means for separating oil from water involving a first tank for gravity separation, a heater to break down emulsified portions of the oil separated from the water in the first tank and a second tank for separating out the water of the broken down emulsified recovered oil, the second tank being a hot tank relying again upon gravity separation. Heat recovery tanks are also included. The first mentioned tank includes a series of chambers to minimize turbulence and enhance oil-water phase separation.

None of the foregoing patents anticipates or renders obvious the process and apparatus of the present invention due to failure to describe or suggest the particular sequence of steps and arrangement of apparatus components. Additionally, none describes the unique arrangement involving the hydrophobic wick. In this regard, it should be mentioned that selective filters have been heretofore disclosed but not in the context of the present invention. Thus, for example, U.S. Pat. No. 3,794,583 describes an oil-water separation method and apparatus involving the use of an oil-mop structure made from fibrillated strips of polypropylene to attack oil as the oil-water mixture is passed by it. U.S. Pat. No. 3,810,832 also describes an oil-mop structure to likewise selectively filter out oil from an oil-water mixture. However, neither of these references teach or suggest the use of the described oil-mop as a true "wick", i.e., to draw a liquid upwardly in a selective manner and in defiance of gravity, much less in the particular combination of components and process steps as used in the present invention.

Lastly, it should be mentioned that MAPCO, INC. of Tulsa, Oklahoma describes what is an "Advanced Oil/Water Separation Dual Mode Gravity and Coalescing Separator" (sales bulletin from the Process and Pollution Controls Division, 1977). This system relies upon gravity separation, filters and coalescers. It does not, however, teach the multistage, hydrophobic wick technique of the present invention.

In summary, although the prior art is repleat with descriptions of apparatus and methods of separation of oil from water, no prior art anticipates or renders obvious the process and apparatus of the present invention.

BRIEF DESCRIPTION OF THE PRESENT INVENTION

The present invention is directed to a process for separating oil from water in a mixture containing oil and water, as well as to means for performing the separation process. Specifically, the process involves:

(a) feeding said mixture to a heated hold-up tank via an inlet located at a lower level of said tank, said tank having a residence time sufficient to permit separation of oil and water and the formation of a water-in-oil emulsion which rises to float atop of said water, said tank being heated to a temperature within the range of about 160° F. to about 180° F.;

(b) removing water from the bottom of said heated hold-up tank;

(c) removing water-in-oil emulsion from the top of said heated hold-up tank via an outlet located above the top of said water in said heated hold-up tank;

(d) feeding said water-in-oil emulsion oil to a hold-up tank having a first compartment and a second compartment, said feeding being to said first compartment;

(e) permitting water contained in said fed water-in-oil emulsion to settle to the bottom of said first compartment;

(f) withdrawing water from the bottom of said first compartment as necessary;

(g) removing oil from the top of said first compartment to said second compartment via a hydrophobic wick; and (h) removing said oil from said second compartment as desired.

DETAILED DESCRIPTION OF THE PRESENT INVENTION AND DRAWINGS

The apparatus and process of the present invention involves a multiplicity of steps which include gravity separation and a selective hydrophobic wick. A mixture containing oil and water is the object of the present invention and the origin of such a mixture is one of many possibilities. Thus, while the present invention may be employed with oil-water mixtures from any source, it has been found to be particularly advantageous with oil-in-water emulsions, e.g., such as those coming from the cutting and grinding industries wherein aqueous baths are employed to clean machined parts having oil thereon and thus oil-in-water emulsions in such aqueous baths become a disposal and waste problem. Until recently such wastes were dumped into storm sewers and allowed to enter and pollute storm drainage systems. Some states are now stopping such practices and are designing disposal and reclamation sites to which wastes must be shipped at the manufacture's expense. Thus, the present invention not only eliminates a waste problem, but it also allows the oil to be reused at considerable cost benefits.

Figure 1:
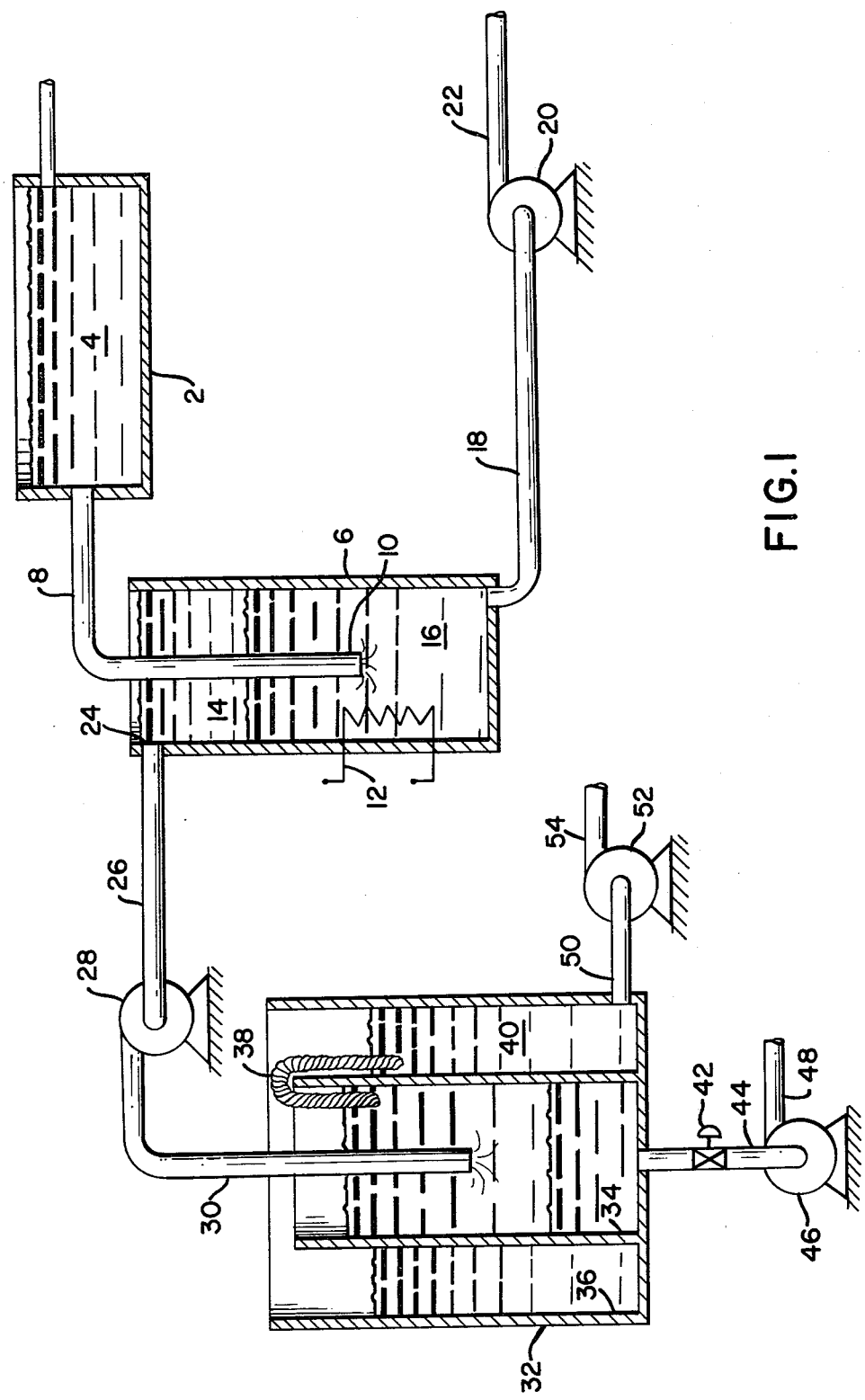
FIG. 1 illustrates a preferred embodiment of the present invention apparatus for separation of oil from water using a multi-stage process including gravity separation and the use of a selective hydrophobic wick; and, FIG. 2 illustrates a similar apparatus which includes electrodes for selective removal of foreign metal and other electrodepositable materials.

FIG. 1 illustrates a preferred embodiment of the present invention wherein an oil-in-water emulsion originates in an aqueous cleaning bath tank 2. The emulsion 4 is fed to heated hold-up tank 6 via pipe 8 at inlet 10, which is located in the lower level of tank 6. Hold-up tank 6 has heater unit 12 which heats the tank to an average temperature within the range of about 160° F. to about 180° F.

As shown, hold-up tank 6 has a sufficient residence time to permit gravity separation of the water and the water-in-oil emulsion such that the water-in-oil emulsion 14 rises to float atop of the water 16. This initial gravity separation is enhanced by heating of hold-up tank 6, as mentioned, due to the resulting simultaneous gravity phase separation and the release of an water-in-oil emulsion content that would otherwise be present. Although only theory, it is believed that breaking up of the oil-in-water emulsion to a water-in-oil emulsion and water is synergistically enhanced by heating due to the reduction of liquid viscosity and due to the larger rate of decrease of the water droplet surface tension relative to that of the oil droplets.

Water 16 may be drawn off the bottom of tank 6 by any means, e.g., by pipe 18 and pump 20. It may, if desired, be recycled for repeated use or other use, e.g., via pipe 22.

Water-in-oil emulsion 14 is removed from the top of heated hold-up tank 6 via outlet 24 of pipe 26, outlet 24 being located above the top of water 16, as shown. Emulsion 14 is then fed via pump 28 and pipe 30 to hold-up tank 32 having a first (Inner) compartment 34 and a second (outer, annular) compartment 36. Oil 14 is fed first compartment 34 wherein a multiple action separation occurs. Some gravity separation removes water from the oil 14 (containing some as yet unseparated water) and simultaneously, a physical separation is achieved by the use of hydrophobic wick 38. This wick is hydrophobic and thus repels remaining water yet selectively draws up in defiance of gravity the oil to provide second compartment 36 with extremely pure oil 40.

Wick 38 may be synthetic (e.g., fiberglass) or natural wick material as long as it is hydrophobic in nature. Additionally, the wick should preferably be woven so as to create an appropriate capillary action when in use. Thus, in this second stage of separation, three distinct activities are occurring in unison to effect final separation—namely, gravity separation, selective attraction-repulsion (hydrophobicity) and capillary action, which is permitted due to the hydrophobicity of the wick to draw up only oil.

Water may periodically be withdrawn from first compartment 34 via valve 42, pipe 44 and optional pump 46 to pipe 48.

Exceptionally pure, used oil 40 may be withdrawn via pipe 50, pump 52 and pipe 54 and may, as desired, be recycled for machining use of may be stored or otherwise employed.

Figure 2:
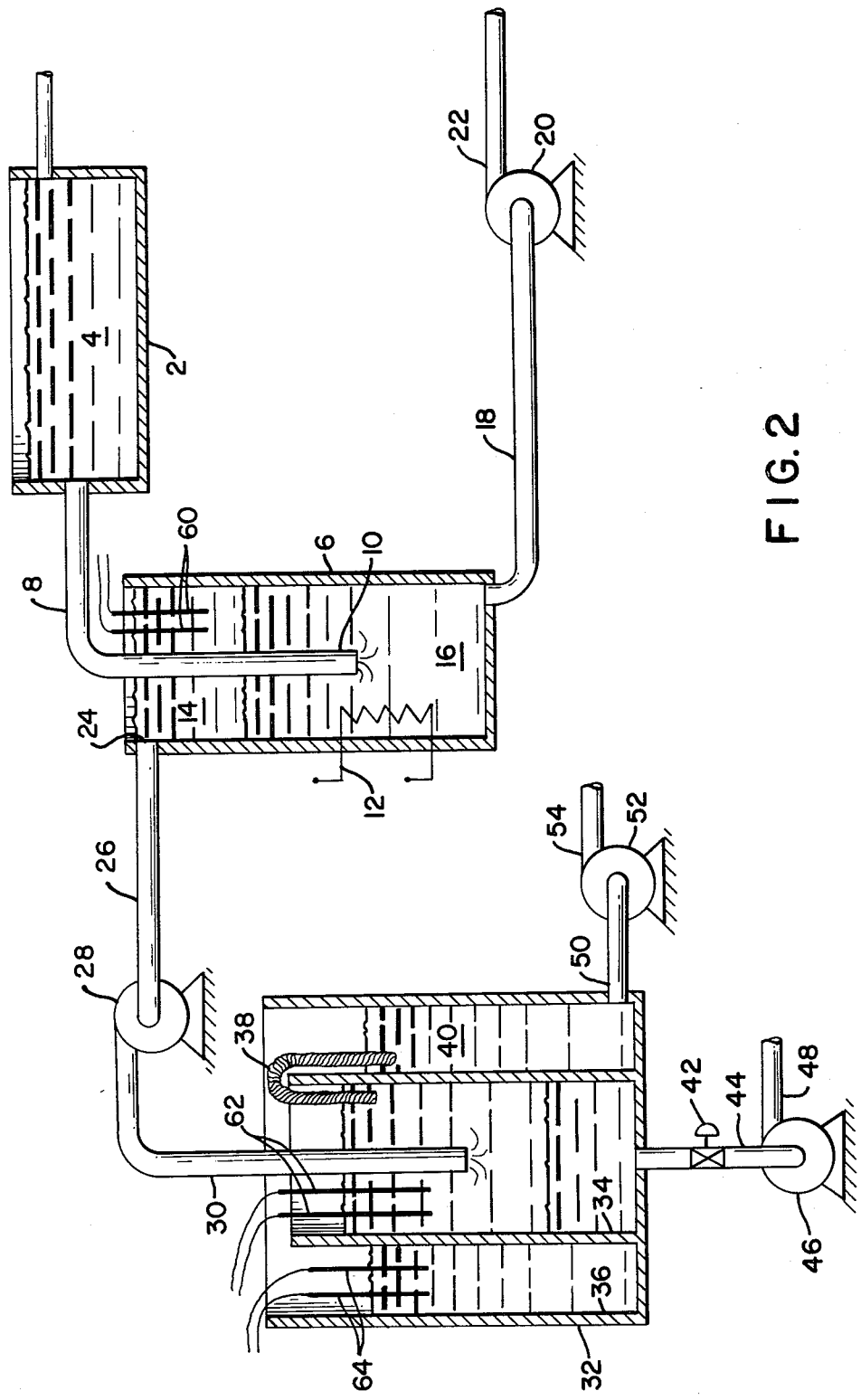

FIG. 2 illustrates an apparatus of the present invention similar to that shown in FIG. 1 except that optional yet advantageous electrodes are shown. Like parts to FIG. 1 are, it is noted, like numbered.

In FIG. 2, plate electrode set 60 is shown in hold-up tank 6. Also, plate electrode set 62 is located in first compartment 34 of tank 32 and plate electrode set 64 is located in second compartment 36 of tank 32. All electrodes have connection wires which are connected to controls (not shown). These electrodes are operated at 6-15 volts and at a current of 1-4 amps, although any effective current and voltage may be employed. The electric current is applied across the electrodes of each set and, as a result, foreign particulate matter, e.g., foreign metal and other electrodepositable materials are precipitated out of the liquids onto the plates. The plates are cleaned as desired. Besides removing foreign particles, the anode and cathode terminals release large amounts of very tiny bubbles of hydrogen and oxygen which provide lift to the lighter oil droplets without providing large turbulence that would tend to mix the emulsion if direct gas bubbling were employed. Thus, the electrodes act as a scavenger of undersirable impurities as well as a promoter of the desired separation.

Although FIG. 2 illustrates three sets of plates, it should now be recognized that more of less than three sets may be employed at any location and in any combination without exceeding the scope of the present invention. Likewise, other variations and alternatives to the foregoing should now be apparent to the artisan and will not exceed the scope of the present invention.

What is claimed is:

1. A process for separating oil from water in a mixture containing oil and water, comprising:
   (a) feeding said mixture to a heated hold-up tank via an inlet located at a lower level of said tank, said tank having a residence time sufficient to permit the separation of oil and water and the formation of a water-in-oil emulsion which rises to float atop of said water, said tank being heated to a temperature within the range of about 160° F. to about 180° F.;
   (b) removing water from the bottom of said heated hold-up tank;
   (c) removing said water-in-oil emulsion from the top of said heated hold-up tank via an outlet located above the top of said water in said heated hold-up tank;
   (d) feeding said water-in-oil emulsion to a hold-up tank having a first compartment and a second compartment, said feeding being to said first compartment;
   (e) permitting water contained in said fed water-in-oil emulsion to settle to the bottom of said first compartment;
   (f) withdrawing water from the bottom of said first compartment;
   (g) removing oil from the top of said first compartment to said second compartment via a hydrophobic wick; and
   (h) removing said oil from said second compartment.

2. The process of claim 1 wherein said mixture containing oil and water is a mixture of cutting oil and an aqueous cleaning solution.

3. The process of claim 2 wherein said mixture is fed to said heated hold-up tank from an aqueous cleaning solution bath apparatus for removing cutting oil from machined parts and wherein said water removed from said heated hold-up tank is recycled to said bath apparatus.

4. The process of claim 1, 2 or 3 wherein said process further comprises:
   (i) applying an electric current across electrodes located in at least one of said tanks so as to precipitate out foreign metal and other electrodepositable materials contained within said mixture and so as to form gas bubbles therein.

5. An apparatus for the separation of oil from water in a mixture containing oil and water, comprising:
   (a) a first hold-up tank, said tank having an inlet located at the lower level of said tank, such that said mixture may be fed into said tank at said lower level, said first hold-up tank having a residence time sufficient to permit separation of oil and water and formation of a water-in-oil emulsion which may rise to float atop of said water, heating means located in said first hold-up tank, said heating means being capable of heating the mixture in said first hold-up tank to a temperature within the range of about 160° F. to about 180° F;
   (b) outlet means for removing water from the bottom of said first hold-up tank;
   (c) outlet means for removing water-in-oil emulsion from the top of said first hold-up tank;
   (d) a second hold-up tank having a first compartment and a second compartment;
   (e) means for feeding said water-in-oil emulsion removed from said top of said first hold-up tank to said first compartment of said second hold-up tank;
   (f) means for withdrawing water from the bottom of said first compartment of said second hold-up tank;
   (g) hydrophobic wick means for removing oil from the top of said first compartment of said second hold-up tank to said second compartment of said second hold-up tank; and
   (h) means for removing oil from said second compartment of said second hold-up tank.

6. The apparatus of claim 5 further comprising:
   (i) electrodes located in at least one said hold-up tanks; and
   (j) means for applying an electric current across said electrodes so as to precipitate out foreign metal and other electrodepositable materials contained within said mixture and so as to form gas bubbles therein.

7. The apparatus of claim 5 or 6 wherein said hydrophobic wick is made of a woven synthetic material.

8. The apparatus of claim 5 or 6 wherein said hydrophobic wick is made of woven fiberglass.

* * * * *